United States Patent Office 3,550,233
Patented Dec. 29, 1970

3,550,233
METHODS OF MAKING ROTORS FOR PISTON TYPE HYDRAULIC PUMPS AND MOTORS
Alfred Moffatt Rubery, Ormskirk, and Kenneth Arthur Harrison, Formby, England, assignors to Joseph Lucas (Industries) Limited, Birmingham, England
Filed May 8, 1968, Ser. No. 727,641
Int. Cl. B23p 15/00
U.S. Cl. 29—156.4        3 Claims

ABSTRACT OF THE DISCLOSURE

A pump or motor rotor is constructed by forming the bores, inserting liners in the bores, machining them and then machining and hardening an external cylindrical bearing surface and finally forming a recess at the end of the rotor to space the bore ends from the surface, with the material thus removed serving as a heat sink during the hardening of the surface.

BACKGROUND OF THE INVENTION

The present invention relates to methods of making rotors for piston and swash plate type pumps and motors of the kind in which a plurality of angularly spaced parallel or inclined bores, to receive respective pistons, are provided with respective liners of a material differing from that of the remainder of the rotor, the rotor having, near one end, an external hardened cylindrical surface forming part of a bearing structure whereby the rotor is mounted in a body of the pump or motor, with the surface being on a portion extending beyond the adjacent ends of the bores. Such a rotor will for convenience be referred to as being of the kind specified.

The object of the invention is to provide a method of making a rotor of the kind specified in a convenient form.

SUMMARY OF THE INVENTION

In accordance with the present invention, a method of making a rotor for a piston and swash plate type machine in which the rotor is provided with a plurality of spaced bores, each containing a liner of a different material from that of the remainder of the rotor and the rotor having near one end an external cylindrical bearing surface formed on a portion of the rotor extending beyond the adjacent ends of the bores, said method including the steps of machining the rotor to form the cylindrical bearing surface near one end, machining bores through the rotor from one end to the other end, heat treating the rotor in the area of the cylindrical bearing surface for case hardening the bearing surface, and recessing the end of the rotor at which the surface is provided so that the surface is formed on an annular portion and the adjacent ends of the bores are spaced axially from said portion.

BRIEF DESCRIPTION OF THE DRAWINGS

The invention will now be described by way of example with reference to the accompanying drawings in which.

DETAILED DESCRIPTION OF THE INVENTION

Figure 1:
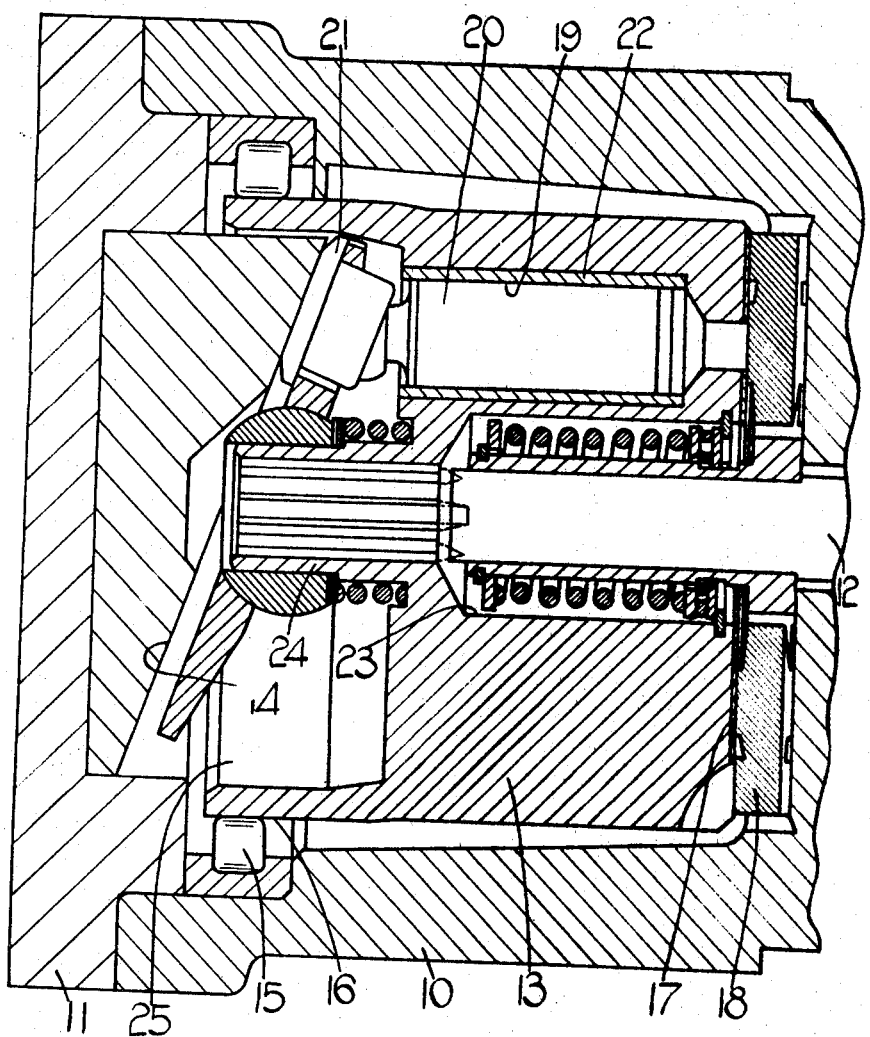
FIG. 1 is a cross-sectional view of an hydraulic motor having a rotor constructed in accordance with the invention.

The hydraulic motor illustrated in FIG. 1 has a body 10 with a detachable end cover 11, a shaft 12 connected to a rotor 13 mounted within the body and an angularly disposed swash plate 14 disposed within the body 10. The rotor 13 is mounted upon a bearing 15 and has an external cylindrical surface 16 against which the rollers of the bearing 15 engage. This surface 16 is at that end of the rotor 13 adjacent to the swash plate 14. The surface 16 is case hardened. The other end of the rotor has a surface layer 17 of a material such as bronze applied thereto, and this end of the rotor bears against a ported member 18 in the body 10.

The rotor has a plurality of equiangularly spaced parallel bores 19 containing respective pistons 20. The pistons 20 have slippers 21 which bear against the angularly disposed surface of the swash plate 14.

The bores 19 are stepped and over their major regions are provided with respective liners 22 and the surface layer 17 is the same. The rotor, in this example, is steel.

The bores 19 can communicate in turn, at their ends remote from the swash plate 14, as the rotor rotates, with ports (not shown) in the ported member 18, which in turn communicate with an inlet and an outlet for liquid in the body (not shown).

The shaft 12 extends through a central bore 23 in the rotor 13 and the rotor is formed with an integral concentric spigot 24 through which the bore 23 also extends, with this spigot being formed at the end at which the bearing surface 16 is provided.

Figure 2:
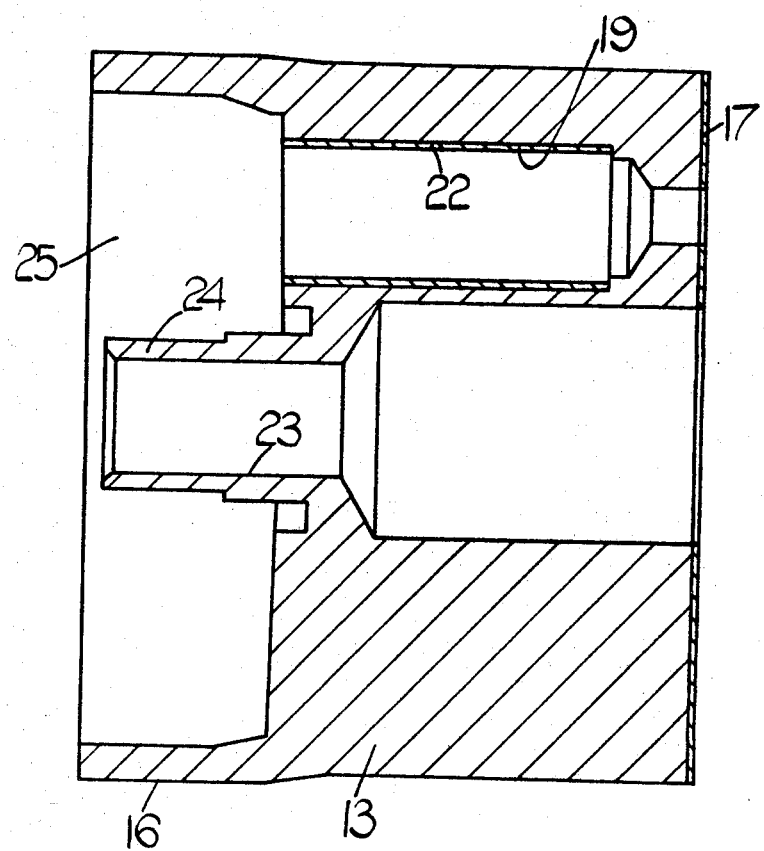
FIG. 2 is a cross-sectional view of the rotor only.

It will be seen from the drawings that the ends of the bores 19 at which the spigot 24 and bearing surface 16 are provided are spaced axially from the surface 16 to define a recess which is identified by numeral 25 in FIG. 2.

The method of making the rotor 13 comprises machining the rotor to form the bores 19. The recess 25 surrounding the spigot 24 is not formed at this stage and the bores 19 extend as far as the end of the rotor at which the bearing surface 16 is provided.

Next the liners 22 are inserted into the respective bores 19, by any convenient method such as by casting. The end of the rotor 13, remote from that at which the bearing surface 16 is provided, also has applied thereto the layer 17. The bores of the liners 22 and surface layer 17 are now machined to their finished dimensions.

The bearing surface 16 is next machined and ground to its finished dimensions and the central bore 23 is formed. Following this, the region of the rotor 13 on which the surface 16 is formed is heat treated to case harden the surface 16.

Finally, the recess 25 is formed by machining, thus spacing the adjacent ends of the bores 19 from the portion on which the surface 16 is provided. The body of metal which is removed to form the recess 25, during the heat treatment to case harden the portion having the surface 16, serves as a heat sink thus limiting any distortion of the bores to the end portions thereof which are subsequently removed.

Although the machine illustrated is a motor, it can also be used as an hydraulic pump.

Having thus described our invention what we claim as new and desire to secure by Letters Patent is:

1. A method of making a rotor for a piston and swash plate type machine in which the rotor is provided with a plurality of spaced bores, each containing a liner of a different material from that of the remainder of the rotor and the rotor having near one end an external cylindrical bearing surface formed on a portion of the rotor extending beyond the adjacent ends of the bores, said method including the steps of machining the rotor for forming the cylindrical bearing surface near one end, machining bores through the rotor from one end to the other end, heat treating the rotor in the area of the cylindrical bearing surface for case hardening the bearing surface, and recessing the end of the rotor at which the surface is provided so that the surface is formed on an annular portion and the adjacent ends of the bores are spaced axially from said portion.

2. The method of making a rotor for a piston and swash plate type machine as claimed in claim 1 including the step of applying a surface layer to the end of the rotor remote from the bearing surface at the time the bore liners are inserted.

3. The method of making a rotor for a piston and swash plate type machine as claimed in claim 1 including the step of forming the rotor at the end at which the bearing surface is provided with a spigot during the recessing step.

References Cited

UNITED STATES PATENTS

| | | | |
|---|---|---|---|
| 2,817,562 | 12/1957 | Fleming et al. | 29—156.5UX |
| 2,925,648 | 2/1960 | Aspelin | 29—156.4 |
| 3,191,852 | 6/1965 | Kaatz et al. | 103—216X |
| 3,192,862 | 7/1965 | Schrader | 103—115 |
| 3,221,660 | 12/1965 | D'Amato | 103—162X |
| 3,280,758 | 10/1966 | Leeming et al. | 103—162 |
| 3,303,794 | 2/1967 | Hagemann | 103—162 |
| 3,346,176 | 10/1967 | Ezop | 103—216X |
| 3,412,447 | 11/1968 | Summerfield | 29—149.5 |

JOHN F. CAMPBELL, Primary Examiner

V. A. DiPALMA, Assistant Examiner

U.S. Cl. X.R.

103—162